Nov. 15, 1966  C. R. WARD  3,285,726
MANUFACTURE OF GLASS

Filed July 3, 1963  2 Sheets-Sheet 1

INVENTOR.
CECIL R. WARD
BY
Oscar L. Spencer
ATTORNEY

INVENTOR.
CECIL R. WARD
BY
Oscar L Spencer
ATTORNEY

United States Patent Office 3,285,726
Patented Nov. 15, 1966

3,285,726
MANUFACTURE OF GLASS
Cecil R. Ward, Gibsonia, Pa., assignor to Pittsburgh Plate Glass Company, Pittsburgh, Pa., a corporation of Pennsylvania
Filed July 3, 1963, Ser. No. 292,605
4 Claims. (Cl. 65—83)

This application relates to the manufacture of flat glass and more particularly to the manufacture of sheet or window glass. The invention to be herein described makes it possible to materially improve the quality of the product.

Flat glass, manufactured by the conventional and known process, is usually imperfect in one or more respects. The imperfections may arise during melting, fining and/or forming, and in the case of plate glass, may arise during finishing. The imperfections which arise during melting and fining affect what is known in the trade as the "metal" quality of the glass. One of these metal quality imperfections is called ream. Ream is defined in the "Glass Glossary," compiled by the Glass Division Committee on Classification, Nomenclature and Glossary, of the American Ceramic Society, June 1948, as "An imperfection; non-homogeneous layers in flat glass."

In virtually all sheet glass processes, of which there are three major ones, the ream in the sheet produced is continually most severe and persistent near the edges of the sheet. The invention to be described makes it possible, by controlling glass flow prior to sheet formation, to materially reduce the severity and persistence of ream in the sheet produced, and, in many cases, eliminate ream in the sheet. This, of course, improves the visual quality of the glass, because ream is known to be visually distinguishable and is sometimes confused with pattern, i.e., small thickness variations manifesting themselves as ribs extending in the direction of the draw, so characteristic of drawn sheet glass. The invention will be described with reference to the Pittsburgh or Pennvernon process of making drawn sheet glass, it being understood that the inventive principles can be applied to the Fourcault and Colburn processes of drawing sheet glass by one skilled in the art of drawing sheet glass by those processes.

In the Pittsburgh or Pennvernon process, glass is melted in a large melting tank to which is connected a plurality of drawing bays or kilns from which the glass is drawn by vertically arranged drawing machines. The depth of glass in the kilns is the same as that of the melting tank and all heat is supplied to the kiln by the inflowing glass. To enter the kiln, glass flows under a partially submerged refractory member known as a shut-off. The shut-off provides a barrier to the passage of products of combustion from the melting tank to the drawing kiln. Because more glass flows into the drawing kiln than is consumed in the sheet, there is a return flow of glass from the kiln to the melting tank. The principles of convection flow dictate the flow of glass into and out of the kiln. Thus, the glass tends to flow to the coldest regions of the kiln, so that the return flow of glass is in the lower region of the kiln.

The present invention utilizes the principles of convection flow to obtain the improvement in the virtual elimination of ream in the sheet. As previously stated, ream is continually most severe and persistent near the edges of the sheet. If the glass normally flowing into the edges of the sheet, which generally contains the reamy glass, is diverted, so as to eventually flow back to the melting tank, the ream condition in the sheet can be virtually eliminated. The described results can be accomplished by modifying the temperature distribution of the glass flowing into the sheet without increasing the viscous coupling of the glass to any ceramic or clay member of the drawing arrangement, so as to change the direction of flow of a portion of this glass and cause this glass to join the return flow of glass flowing back to the melting tank. The temperature modification actually accelerates the flow of glass downwardly into the kiln and to the return flow of glass. Temperature modification can be accomplished by selectively cooling the glass closely adjacent the shut-off and the edge walls of the drawing kiln without increasing the viscous coupling of the glass and the shut-off and edge walls or without increasing the viscosity of the glass in contact with the shut-off and the edge walls of the kiln. It is desirable to shield the flow of glass to the return flow from any cooling of the glass flowing toward the draw, so as to insure a high differential of viscosity between the two streams of glass.

To further describe this invention, attention is directed to the drawings forming a part of this application and in which.

Figure 1:
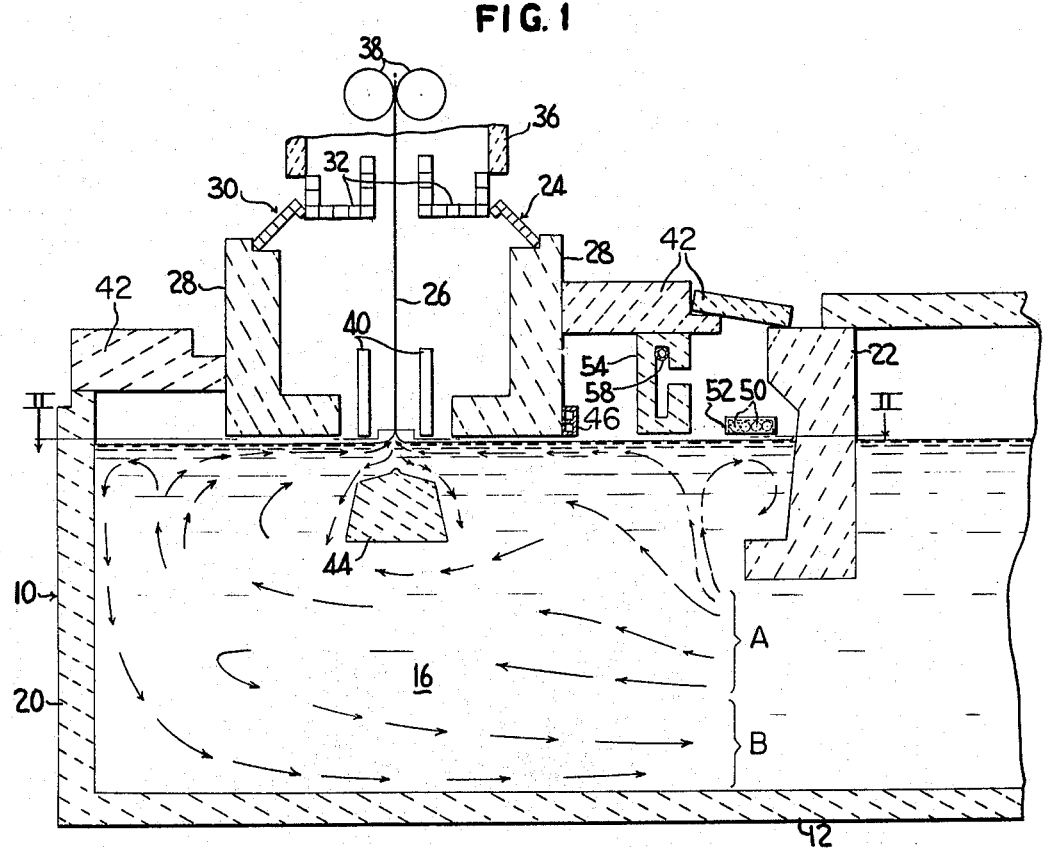
FIG. 1 is a longitudinal sectional view of a conventional Pittsburgh or Pennvernon drawing kiln modified in accordance with this invention and showing the flow of glass into and out of the kiln as well as the flow of glass within the kiln.
Figure 2:
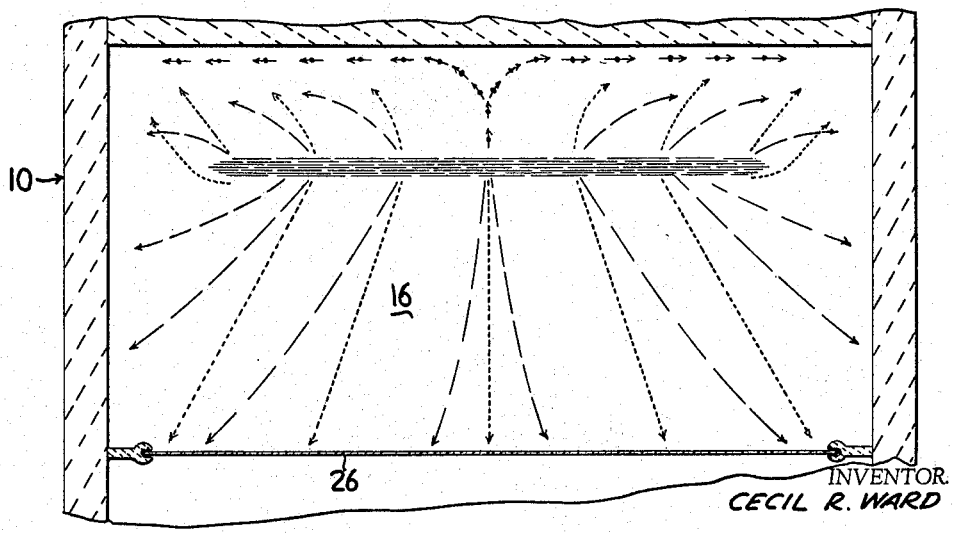
FIG. 2 is an elevational view of the apparatus of FIG. 1 taken on line 2—2 of FIG. 1 showing the flow of glass from a spring zone in a modified Pennvernon kiln together with an indication of the flow in a conventional Pennvernon kiln for comparative purposes.

Looking now at FIGS. 1 and 2, there is illustrated a typical Pennvernon or Pittsburgh drawing kiln 10 connected to a melting tank 12 (only a part of which is shown). The bottom 14 of the kiln is a continuation of the bottom of the melting tank, so that the level of the glass 16 is the same in both the melting tank 12 and the kiln 10.

The drawing kiln 10 includes an end wall 18, side or edge walls 20 and a refractory member 22, known as a shut-off, which is partially submerged in the glass 16. The shut-off 16 is an obstruction to the products of combustion from the melting tank to the drawing kiln and also to any surface flow of glass from one to the other. The drawing kiln also includes a cooled drawing chamber, generally identified as 24, drawn from the surface of the glass 16, through which the glass ribbon 26 passes. The drawing chamber 24 is defined by spaced, refractory L-blocks 28, ventilator coolers 30, catch-pan coolers 32 and end walls 34. A suspended, vertically arranged drawing machine 36 (only part of which is shown) which includes spaced pairs of drawing rolls 38, provides the tractive force to draw the glass ribbon 26 upwardly. The ribbon is capped into sheets at the top of the machine 36 by suitable cutting means (not shown or further described). The catch pan coolers 32 are adapted to receive any broken glass or glass chips which may fall downwardly within the machine 38. Within the drawing chamber 24 and spaced from opposite sides of the ribbon of glass 26 are machine coolers 40 which absorb radiant energy from the glass ribbon 26 as it is formed. These coolers, as well as the other coolers described, extend substantially the width of the drawing chamber 24. Cover tiles 42 are located between the front and back extremities of the drawing kiln 10 and the L-blocks, so as to enclose the kiln 10. A refractory member 44, known as a draw bar, is submerged within the glass and stabilizes the position of the drawn sheet. Generally, a hair-pin cooler 46 spanning the drawing kiln is placed at the rear of the L-block 28 to condition the glass flowing to the draw in accordance with the teachings of the application for United States Letters Patent of Jean M. Peeters, Serial No. 549,466, filed November 28, 1955, now abandoned.

In the figures being described which incorporate the features of this invention, the general pattern of flow of glass is indicated by arrows. The inflowing glass is identified by the reference A while the return flow of colder glass is represented by the reference character B. Glass from the melting tank flows under the shut-off 22 and upwardly toward the surface of the pool. The glass divides in a flow toward the base 26a of the sheet and in a flow toward the shut-off. That flowing toward the shut-off eventually joins the return flow B. This flow of glass is known as a "spring zone," generally identified as S. A spring zone also exists closely adjacent the front or end wall 18 of the kiln. The spring zone closely adjacent the shut-off 22 and the flow of glass adjacent thereto is shown, in plan, in FIG. 2. Note that the glass flowing from the spring zone diverges toward the sides of the kiln, or to the cooler zones.

If the temperature distribution of the glass adjacent to and particularly near the spring zone is changed, the flow of glass therefrom can be changed. Thus, if a cooler is placed behind the spring zone (closely adjacent the shut-off 22) the glass flowing from the edges of the spring zone is cooled and descends more rapidly into the return flow of glass to the melting tank. The sheet will receive a larger percentage of glass from the center of the kiln, which glass is generally hotter than that at the edges and also is generally more uniform, i.e., homogeneous, so that the glass produced will contain little, if any, ream.

Figure 3:
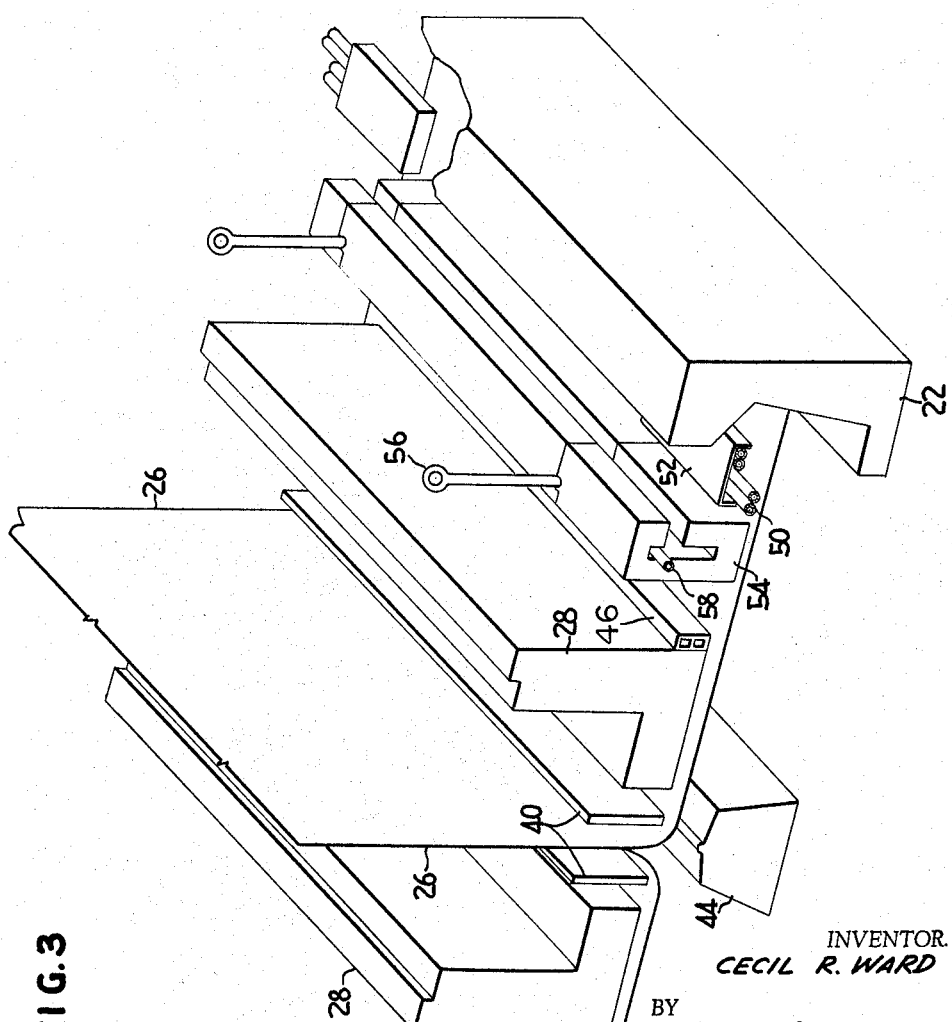
FIG. 3 is an isometric view of a portion of an apparatus similar to FIGS. 1 and 2 and showing apparatus for accomplishing the results according to this invention.

To accomplish the objectives set forth, stub coolers are added to the conventional Pennvernon arrangement. These coolers are located on the shut-off side of the rear spring zone. The stub coolers are covered in order that their effect is localized. Also, a shield of a refractory material is placed between the added stub coolers and the adjacent L-block in order to shield the forwardly flowing glass from any localized cooling. A typical arrangement is shown in FIGS. 1 and 3. FIG. 3 is not as detailed as is FIG. 1 for the sake of clarity.

In accordance with this invention stub hair-pin coolers 50 are placed over the molten glass near the shut-off 22 and on the shut-off side of the spring zone. The stub coolers each extend not less than 10 percent of the kiln width and not more than 25 percent of the kiln width. Little, if any, results are obtainable with very short coolers; i.e., less than 10 percent of the kiln width, and long coolers, i.e., more than 25 percent of the kiln width provide too much cooling and affect the drawing operation by freezing the glass flow. Generally, the best results are obtainable with lengths approximating 15 percent of the kiln width. The stub coolers are each covered with a ceramic cover 52 having side and end walls to encompass the coolers so as to insure localized cooling of the glass without increasing the viscous coupling of the glass to any adjacent ceramic or clay member which includes the shut-off and the walls of the tank, and prevent general cooling which could upset the formation of the ribbon 26. The cooling afforded by the cooler 50, through which water passes, modifies the temperature distribution of the glass across the kiln and causes the glass cooled thereby to accelerate its descent into the mass of glass in the kiln returning to the melting tank, which flow is identified in FIG. 1 as B. The modified flow of glass, indicated by broken lines in FIG. 2, may be compared with the conventional flow of glass, indicated by dotted lines, also in FIG. 2. From this comparison, it can easily be seen that a greater quantity of glass flowing centrally of the kiln is consumed in the ribbon. Because centrally flowing glass is more homogeneous, the metal quality of the sheet is improved. No speed change is noted by the use of the coolers 50.

In addition to the stub-coolers 50 and the covers 52 therefor which limit the cooling effect thereof to the glass, a ceramic partition or shield 54 is suspended by hangers 56 between the stub hair-pin coolers 50 and the adjacent L-block 28.

The shield 54 is, because of its size, constructed of several sections which are joined to provide the width to span the width of the drawing kiln. As shown, the cross-section is substantially C-shaped and receives a pipe 58 which is joined to and is a horizontal part of the hangers 56. The hangers 56 are hung from a portion of the superstructure of the drawing kiln (not shown).

The shield 54 prevents the cooling of the forward flow of glass from affecting the temperature (and viscosity) of the glass at the spring zone and at the shut-off 22.

The use of the arrangement above described, which, as previously stated, accelerates the flow of glass to the return flow near the side walls of the drawing kiln, has resulted in a 50 percent or more reduction in the quantity of ream in a sheet. The shield 54 has also improved the operation of the drawing apparatus. Not only does the shield prevent unwanted and undesirable cooling effects from the main hair-pin coolers and also the stub coolers, the shield serves as a radiant heat reflector and has also improved the uniformity of the temperature profile across the kiln with a resultant decrease in sheet thickness variations.

I claim:
1. A process for manufacturing glass which comprises melting glass batch materials to form a source of supply of molten glass,
flowing glass from said source of supply to a zone from which glass is withdrawn in ribbon form to form a single spring zone adjacent the zone of glass withdrawal and said source of supply of molten glass so that glass emanates from said spring zone along one path to said zone of withdrawal and a second path towards said source of supply of molten glass,
flowing a portion of said molten glass from said spring zone toward said zone of glass withdrawal,
flowing the remaining portion of said molten glass away from said spring zone and said zone of glass withdrawal, and
cooling a portion of the molten glass in said second path flowing away from said spring zone to change the direction of the flow thereof toward said source of supply of molten glass.
2. The process of claim 1, wherein said molten glass in said second path of flow emanating from said spring zone has opposing edges and a portion of the molten glass in said second path of flow adjacent at least one edge thereof is cooled to change the direction of the flow thereof toward said source of supply of molten glass.
3. In an apparatus for drawing sheet glass,
a melting tank in which glass batch materials are melted to provide a source of supply of molten glass,
a drawing kiln having bottom and side walls, said melting tank and drawing kiln having aligned openings and being interconnected thereat so that molten glass is free to pass from said source of supply thereof in said melting tank into said drawing kiln to maintain a predetermined level of molten glass in said tank and said kiln,
means mounted above said drawing kiln for withdrawing glass in ribbon form from the molten glass at a gathering point therein in said drawing kiln,
a refractory shut-off member supported between said melting tank and said drawing kiln, and extending across a portion of the opening in the connection therebetween and downwardly to a point below the level of the molten glass maintained in said drawing kiln, the remainder of said opening below said shut-off member being adapted to permit the flow of molten glass from the source of supply thereof in said melting tank into said drawing kiln and to form a spring zone between said point of gather and said shut-off member, from which spring zone glass emanates along one path to said gathering point and a second path towards said source of supply of molten glass, and at least one cooling means mounted above the level of the molten glass in said drawing kiln in the region where said second path of molten glass flows toward said source of supply, said cooling means extending only a short distance from the adjacent side wall of said drawing kiln over said molten glass.

4. An apparatus as set forth in claim 3, having a barrier member supported in and spanning the width of said drawing kiln and depending to a point immediately above the level of the molten glass in said drawing kiln and the spring zone therein.

References Cited by the Examiner

FOREIGN PATENTS 585,875 10/1959 Canada.
327,906 7/1935 Italy.

DONALL H. SYLVESTER, *Primary Examiner*.

F. W. MIGA, *Assistant Examiner*.